(12) United States Patent
Chuang (10) Patent No.: US 8,578,561 B2
(45) Date of Patent: Nov. 12, 2013

(54) DUAL-AXIS HINGE AND PORTABLE DEVICE WITH THE SAME

(75) Inventor: Chih-Kuang Chuang, New Taipei (TW)

(73) Assignee: Shin Zu Shing Co., Ltd., New Taipei (TW)

( * ) Notice: Subject to any disclaimer, the term of this patent is extended or adjusted under 35 U.S.C. 154(b) by 0 days.

(21) Appl. No.: 13/353,342

(22) Filed: Jan. 19, 2012

(65) Prior Publication Data

US 2013/0187525 A1   Jul. 25, 2013

(51) Int. Cl.
*E05D 7/00* (2006.01)

(52) U.S. Cl.
USPC .............................................. 16/354; 16/366

(58) Field of Classification Search
USPC .................. 16/354, 366, 365, 368, 369, 370; 361/679.08, 679.11, 679.02, 679.15, 361/679.27; 455/90.3, 575.1, 575.3, 575.8; 379/433.12, 433.13; 348/373, 333.01, 348/333.06, 794
See application file for complete search history.

(56) References Cited

U.S. PATENT DOCUMENTS

| | | | | |
|---|---|---|---|---|
| 2,206,739 | A * | 7/1940 | Brogren et al. | 16/354 |
| 4,916,926 | A * | 4/1990 | Shieh | 70/135 |
| 6,785,935 | B2 | 9/2004 | Ahn et al. | |
| 6,925,684 | B2 * | 8/2005 | Kang et al. | 16/264 |
| 7,140,074 | B2 | 11/2006 | Han et al. | |
| 7,414,834 | B2 | 8/2008 | Ukonaho et al. | |
| 7,484,271 | B2 | 2/2009 | Oshima et al. | |
| 7,832,057 | B2 * | 11/2010 | Hoffman | 16/367 |
| 2002/0038493 | A1 * | 4/2002 | Ko et al. | 16/303 |
| 2005/0050686 | A1 | 3/2005 | Kurokawa | |
| 2008/0307608 | A1 | 12/2008 | Goto | |
| 2009/0013500 | A1 * | 1/2009 | Ueyama et al. | 16/354 |
| 2009/0070961 | A1 | 3/2009 | Chung et al. | |
| 2010/0071159 | A1 * | 3/2010 | Myung | 16/303 |
| 2011/0157780 | A1 * | 6/2011 | Wang et al. | 361/679.01 |
| 2011/0289728 | A1 * | 12/2011 | Wang et al. | 16/337 |

FOREIGN PATENT DOCUMENTS

TW   M361209 U1   7/2009
TW   M391012 U1   10/2010

* cited by examiner

*Primary Examiner* — Chuck Mah
(74) *Attorney, Agent, or Firm* — Alan Kamrath; Kamrath IP Lawfirm, P.A.

(57) ABSTRACT

A dual-axis hinge is mounted between a cover and a base of a portable device and has a connecting bracket, an upper rotating bracket, a lower rotating bracket, an upper active gear, a lower active gear and a transmission gear assembly. The connecting bracket is mounted between the upper and lower rotating brackets. The upper and lower active gears are connected respectively to the upper and lower rotating brackets. The transmission gear assembly is connected between the upper and lower active gears to adjust a velocity ratio of the upper and lower active gears. Therefore, the cover and the base align with each other without a drop whether or not the upper and lower active gears are the same in teeth number or whether or not the included angles between the upper and lower rotating brackets with the connecting bracket are the same.

27 Claims, 11 Drawing Sheets

FIG.11
PRIOR ART

DUAL-AXIS HINGE AND PORTABLE DEVICE WITH THE SAME

BACKGROUND OF THE INVENTION

1. Field of the Invention

The present invention relates to a dual-axis hinge and, especially, to a dual-axis hinge mounted between a cover and a base of a portable device to allow the cover to be pivoted relative to the base.

2. Description of the Prior Arts

With the progress of the technology, conventional portable devices have different types. Tablet personal computers become the mainstream of the portable devices. To minimize the volume, the manufacturers consider developing foldable tablet personal computers.

U.S. patent publication No. 2008/0307608 and U.S. Pat. No. 7,140,074, which are incorporated herein as references, both disclose a conventional hinge with gears. The conventional hinge has two gears to allow the cover to pivot relative to the base. The disadvantage of the conventional hinge is that the conventional hinge covers a part of the screen, since the conventional hinge is mounted in the middle of the cover and the base. Therefore, when the cover is opened relative to the base, the screens on the cover and the base cannot be continuous as a whole screen. Then, the conventional hinge is not capable of being used in tablet personal computers.

Furthermore, the conventional hinges in the aforementioned references have another disadvantage. When the cover is closed relative to the base, the conventional hinge is at an included angle of 90 degrees respectively with the cover and the base (as shown in FIG. 11 of US Patent Publication No. 2008/0307608). The two gears have the same diameter and teeth number so that the thicknesses of the cover and the base have to be the same. If the cover is thinner than the base, the gear connecting to the cover protrudes out from the top or bottom surfaces, especially the top surface. Then, the portable device has an uneven surface and results in an unpleasant appearance.

Figure 10:
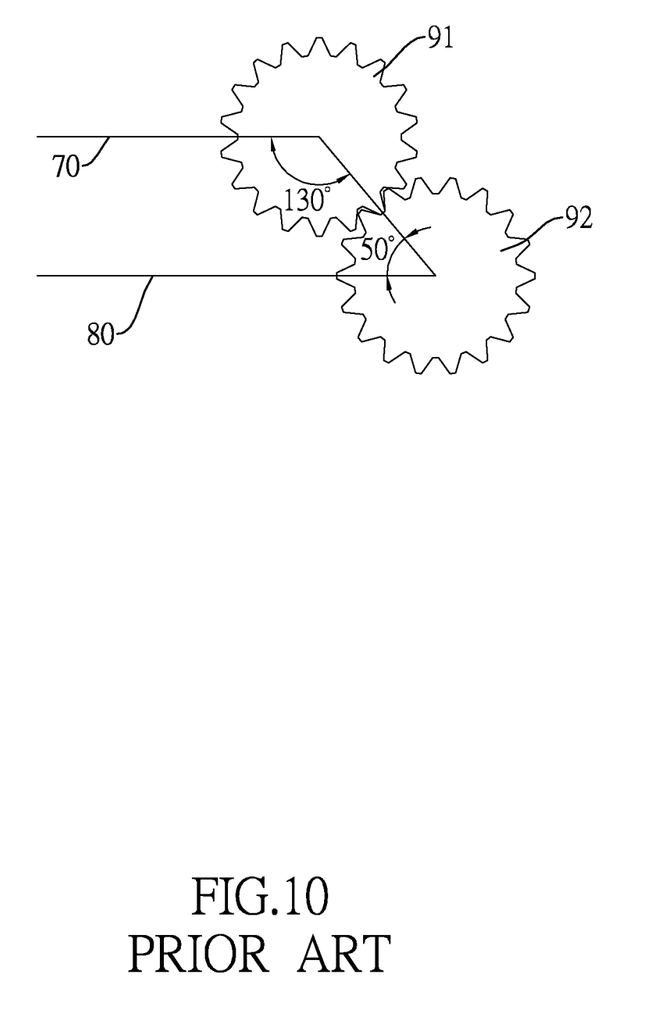
FIG. 10 is an operational side view of a conventional portable device in accordance with the prior art, shown closed.
Figure 11:
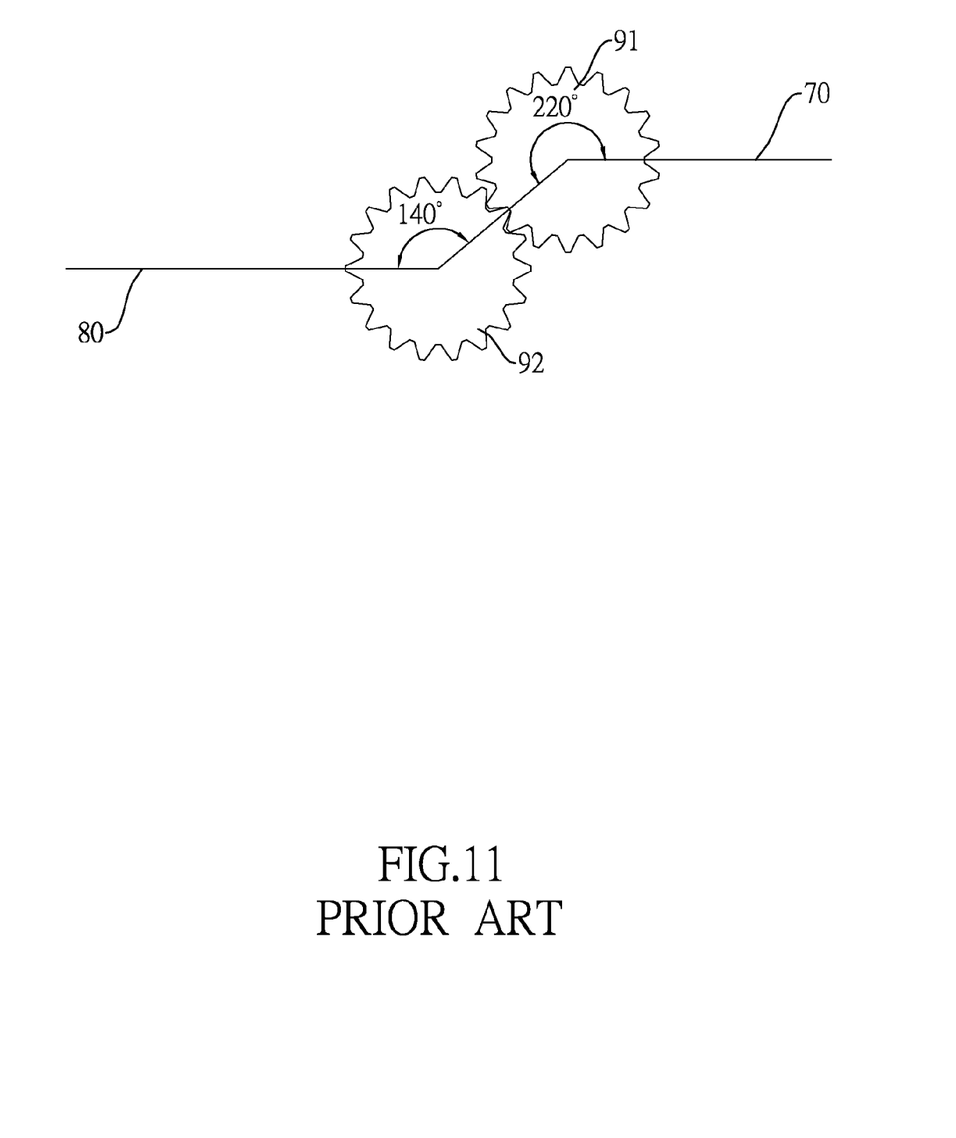
FIG. 11 is an operational side view of the conventional portable device in FIG. 10, shown opened.

Moreover, with reference to FIG. 10, when the cover 70 is closed relative to the base 80, the conventional hinge is at included angles that are not equal to 90 degrees with the cover and the base. Then, the gears 91, 92 having the same diameter are not applicable. For example, if the conventional hinge is at an included angle of 50 degrees with the base 80, the conventional hinge is at an included angle of 130 degrees with the cover 70. Since the gears 91, 92 are the same, the gears 91, 92 have the same teeth number. When the cover 70 is opened and the first gear 91 is rotated at 90 degrees, the second gear 92 is also rotated at 90 degrees as shown in FIG. 11. Then, the top surfaces of the cover 70 and the base 80 do not align with each other and form a drop. Therefore, the conventional hinge is not applicable for tablet personal computers.

To resolve the aforementioned problems, the gears need to have unequal diameters and teeth number to maintain an equal rotating rate. Although the conventional hinge with the gears having different diameters may be used for the portable devices with the cover and the base having different thicknesses, the conventional hinge with gears having different diameters cannot be used in portable devices with the cover and the base having the same thicknesses.

Thus, the conventional hinges with gears cannot be utilized in portable devices having different specifications.

To overcome the shortcomings, the present invention provides a dual-axis hinge to mitigate or obviate the aforementioned problems.

SUMMARY OF THE INVENTION

The main objective of the present invention is to provide a dual-axis hinge that allows the cover and the base of the portable device to link as a whole plane whether or not the thicknesses of the cover and the base are the same. The dual-axis hinge is mounted between the cover and the base of the portable device and has a connecting bracket, an upper rotating bracket, a lower rotating bracket, an upper active gear, a lower active gear and a transmission gear assembly. The connecting bracket is mounted between the upper and lower rotating brackets. The upper and lower active gears are connected respectively to the upper and lower rotating brackets. The transmission gear assembly is connected between the upper and lower active gears to adjust a velocity ratio of the upper and lower active gears. Therefore, the cover and the base align with each other without a drop whether or not the upper and lower active gears are the same in teeth number or whether or not the included angles between the upper and lower rotating brackets with the connecting bracket are the same.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
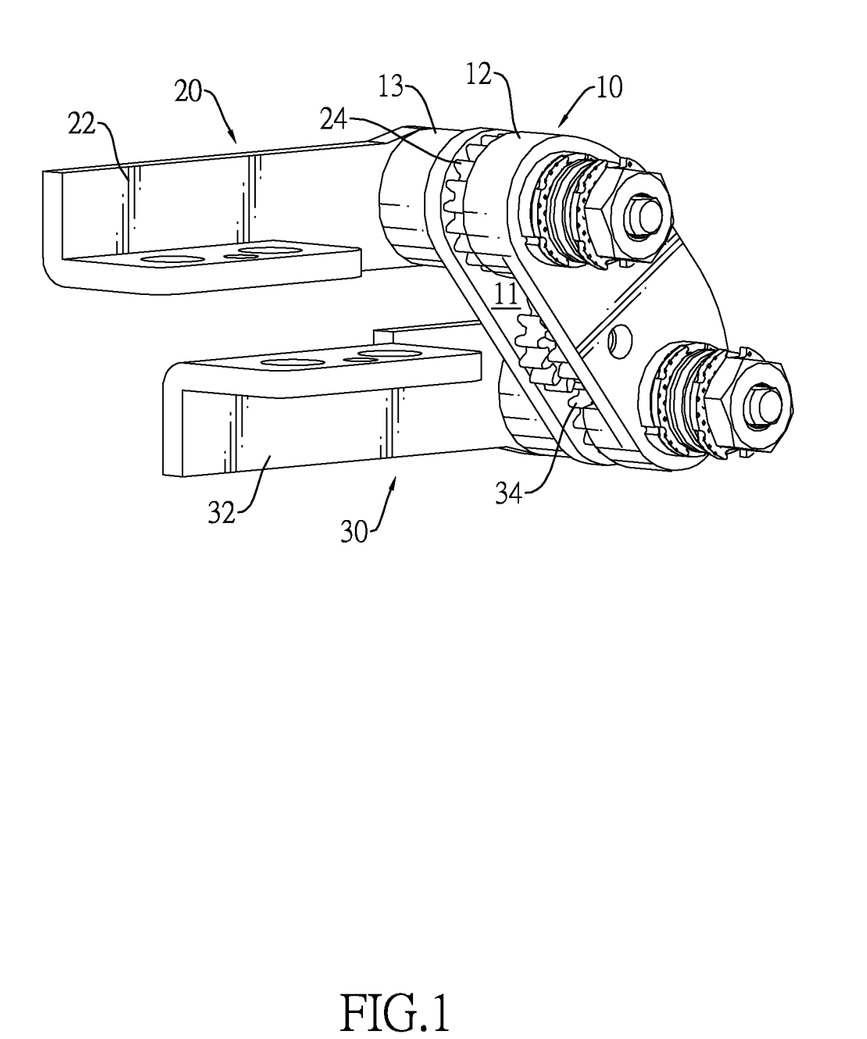
FIG. 1 is a perspective view of a first embodiment of a dual-axis hinge in accordance with the present invention.
Figure 2:
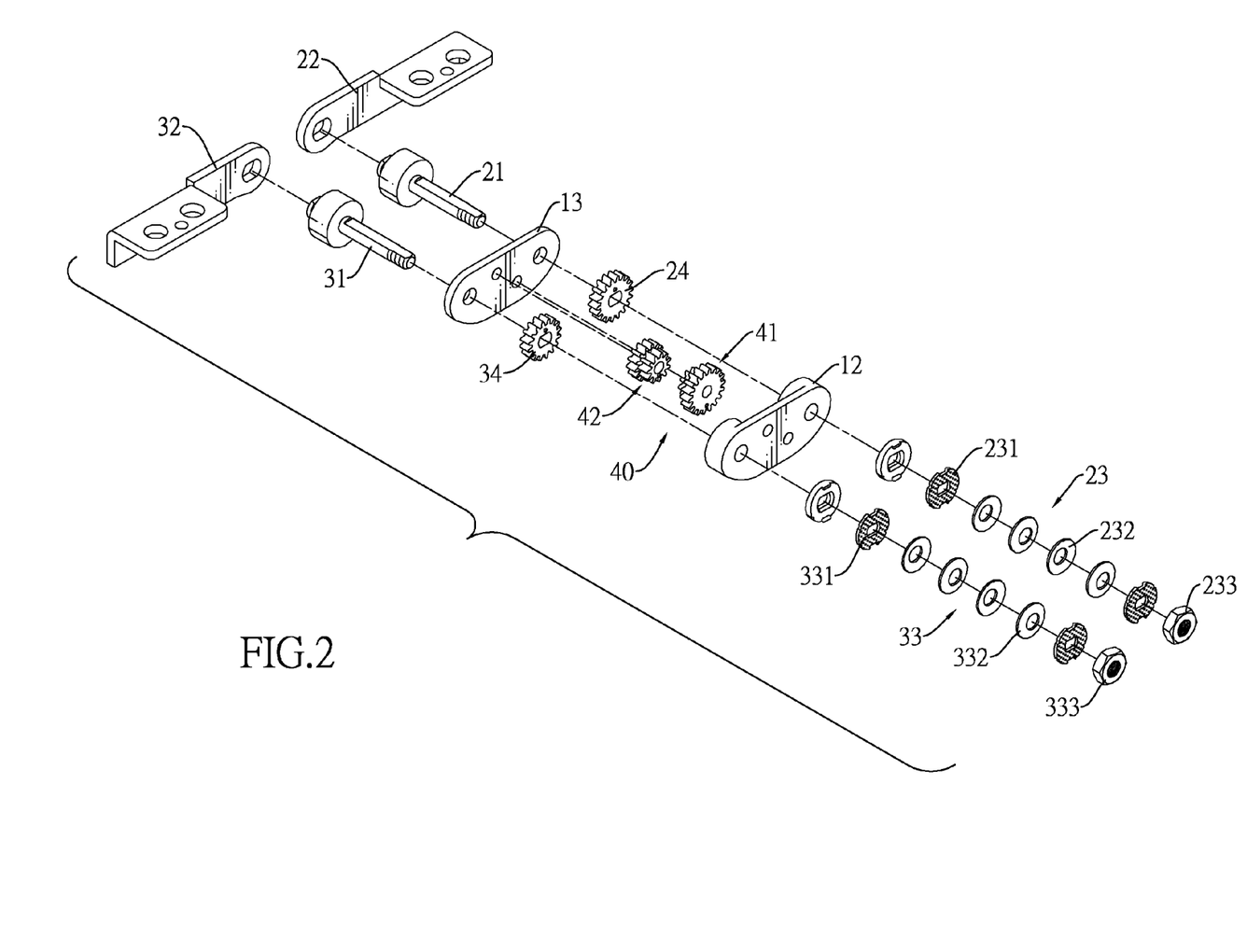
FIG. 2 is an exploded perspective view of the dual-axis hinge in FIG. 1.

With reference to FIGS. 1 and 2, a dual-axis hinge in accordance with the present invention comprises a connecting bracket 10, an upper pintle assembly 20, a lower pintle assembly 30 and a transmission gear assembly 40.

The connecting bracket 10 has a gear room 11 formed therein. In a preferred embodiment, the connecting bracket 10 comprises a front panel 12 and a rear panel 13. The gear room 11 is formed between the front and rear panels 12, 13.

The upper pintle assembly 20 is connected to the connecting bracket 10 and comprises an upper pintle 21, an upper rotating bracket 22, an upper torsion generating assembly 23 and an upper active gear 24. The upper pintle 21 is mounted rotatably through the gear room 11 of the connecting bracket 10 and has two ends. The ends of the upper pintle 21 protrude respectively out of two sides of the connecting bracket 10. The upper rotating bracket 22 is mounted securely around one of the ends of the upper pintle 21. The upper torsion generating assembly 23 is mounted securely around the other of the ends of the upper pintle 21 and comprises an abrasion washer 231, multiple resilient washers 232, a fastener 233, and so on. The upper torsion generating assembly 23 is well known in the art and may alternate as another way to provide torsion. The upper active gear 24 is mounted securely around the upper pintle 21 and is mounted in the gear room 11 of the connecting bracket 10.

The lower pintle assembly 30 is connected to the connecting bracket 10 and comprises a lower pintle 31, a lower rotating bracket 32, a lower torsion generating assembly 33 and a lower active gear 34. The lower pintle 31 is mounted rotatably through the gear room 11 of the connecting bracket 10 and has two ends. The ends of the lower pintle 31 protrude respectively out of two sides of the connecting bracket 10. The lower rotating bracket 32 is mounted securely around one of the ends of the lower pintle 31. The lower torsion generating assembly 33 is mounted securely around the other of the ends of the lower pintle 31 and comprises an abrasion washer 331, multiple resilient washers 332, a fastener 333, and so on. The lower torsion generating assembly 33 is well known in the art and may alternate as another way to provide torsion. The lower active gear 34 is mounted securely around the lower pintle 31 and is mounted in the gear room 11 of the connecting bracket 10.

Figure 3:
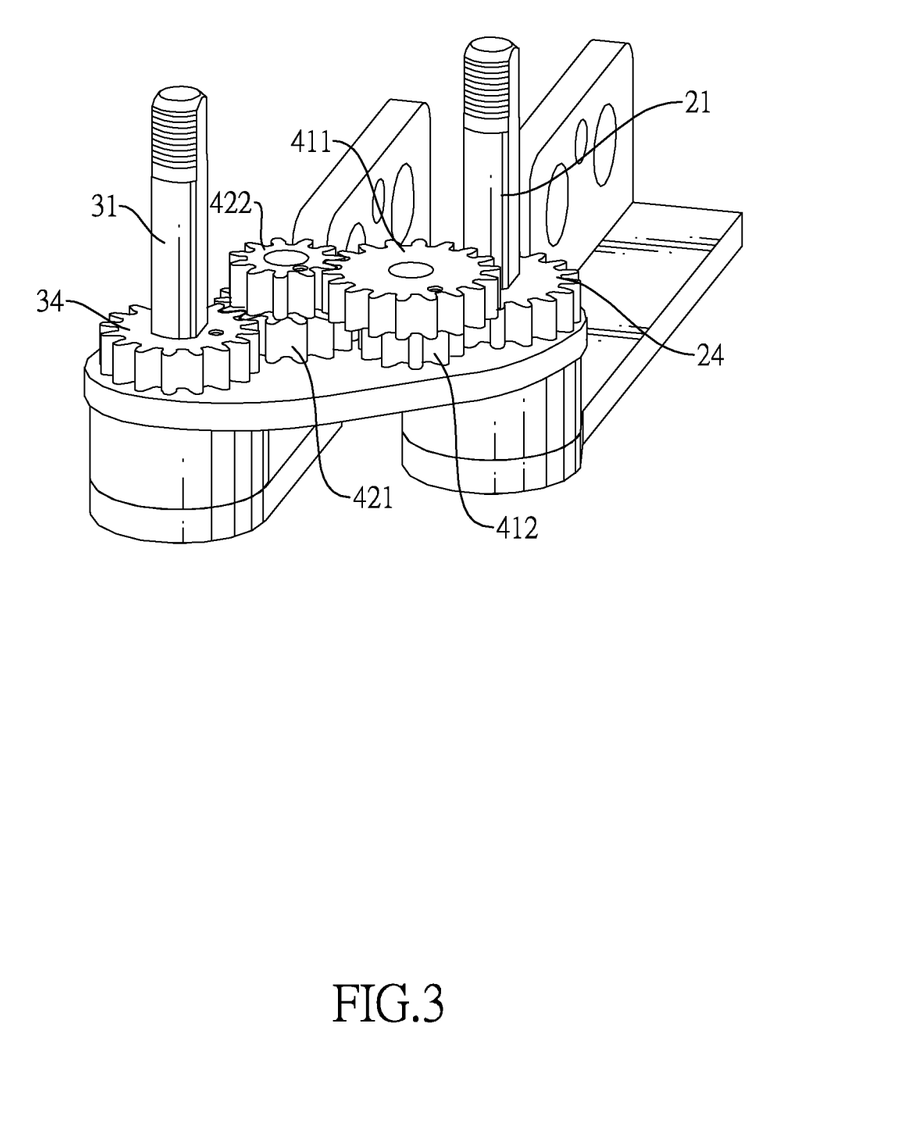
FIG. 3 is an enlarged partial perspective view of the dual-axis hinge in FIG. 1.

With reference to FIGS. 1 to 3, the transmission gear assembly 40 is mounted in the gear room 11 of the connecting bracket 10 and is connected between the upper and lower active gears 24, 34 to adjust the velocity ratio of the upper and lower active gears 24, 34. In a preferred embodiment, the transmission gear assembly 40 comprises an upper inactive gear unit 41 and a lower inactive gear unit 42. The upper inactive gear unit 41 engages the upper active gear 24. The lower inactive gear unit 42 engages the upper inactive gear unit 41 and the lower active gear 34.

Figure 4:
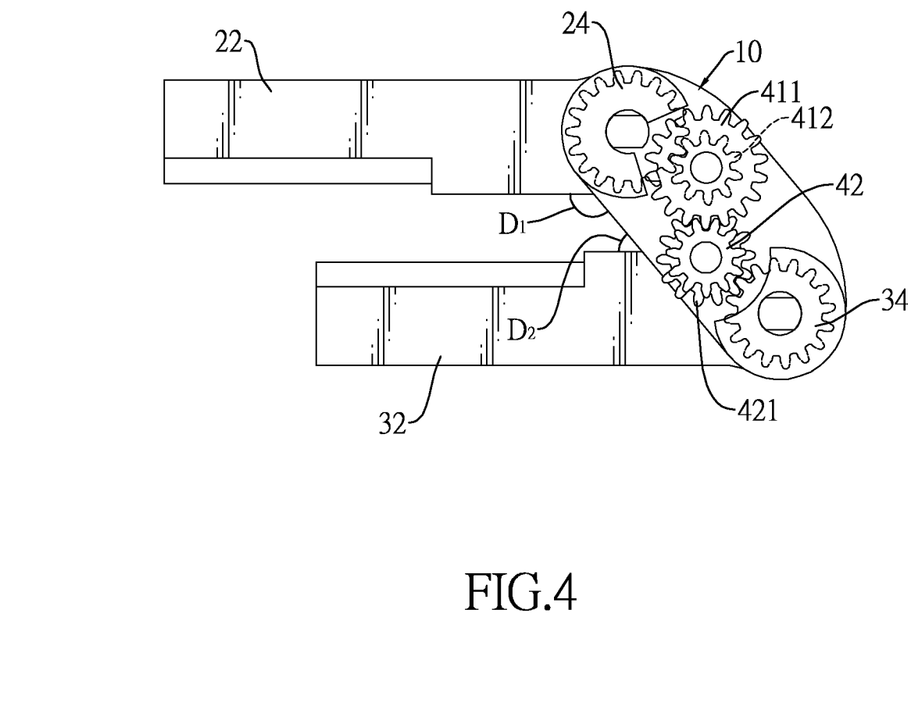
FIG. 4 is an operational side view of the dual-axis hinge in FIG. 1, shown closed.

With reference to FIG. 4, the dual-axis hinge as described is capable of being used in portable devices with different sizes. When the upper rotating bracket 22 is above and parallel to the lower bracket 32, an included angle between the upper rotating bracket 22 and the connecting bracket 10 is $D_1$ and an included angle between the lower rotating bracket 32 and the connecting bracket 10 is $D_2$. The included angle $D_1$ is not equal to the included angle $D_2$. A velocity ratio of the upper and lower active gears 24, 34 is X. The ratio of the included angles is R, i.e. $D_2 \div D_1 = R$. The transmission gear assembly 40 makes the velocity ratio X approximate to or equal to the included angle ratio R, so that the upper rotating bracket 22 aligns with the lower rotating bracket 32 when the upper rotating bracket 22 is relatively opened. In a preferred embodiment, the absolute value of R minus X is smaller than or equal to 1, i.e. $|R-X|<1$. In another preferred embodiment, the absolute value of R minus X is smaller than or equal to 0.5, i.e. $|R-X|<0.5$. In yet another preferred embodiment, the absolute value of R minus X is smaller than or equal to 0.05, i.e. $|R-X|<0.05$. Whether or not the upper and lower active gears 24, 34 are the same in teeth number or whether or not the included angles are the same, the transmission gear assembly 40 adjusts the velocity ratio of the upper and lower active gears 24, 34 to be approximate or even equal to the included angles. Therefore, the upper and lower rotating brackets 22, 32 align with each other without a drop when they relatively open.

The number of the teeth of the upper active gear 24 is $W_1$, and the number of the teeth of the lower active gear 34 is $W_2$. The upper inactive gear unit 41 provides a first velocity variance Y, and the lower inactive gear unit 42 provides a second velocity variance Z. To make the velocity ratio X approximate to or equal to the included angle ratio R, the relationship of the aforementioned values satisfies the following formula:

$$W_1 \times \frac{1}{Y} \times \frac{1}{Z} \times \frac{1}{W_2} = X$$

The transmission gear assembly may have different structures to satisfy the formula. The following description is a preferred embodiment, but not limitation, of the present invention.

With reference to FIGS. 2 and 3, in a preferred embodiment, the upper inactive gear unit 41 comprises a large gear 411 and a small gear 412. The large and small gears 411, 412 are coaxial and may be formed as a tower gear. The small gear 412 of the upper inactive gear unit 41 engages the upper active gear 24. The lower inactive gear unit 42 comprises a large gear 421 and a small gear 422. The large and small gears 421, 422 are coaxial and may be formed as a tower gear. The small gear 422 of the lower inactive gear unit 42 engages the large gear 411 of the upper inactive gear unit 41. The large gear 421 of the lower inactive gear unit 42 engages the lower active gear 34.

The number of teeth of large gear 411 of the upper inactive gear unit 41 is $Y_1$, and the number of teeth of the small gear 412 of the upper inactive gear unit 41 is $Y_2$. The number of teeth of the large gear 421 of the lower inactive gear unit 42 is $Z_1$, and the number of teeth of the small gear 422 of the lower inactive gear unit 42 is $Z_2$. To make the velocity ratio X approximate to or equal to the included angle ratio R, the relationship of the aforementioned values satisfies the following formula:

$$W_1 \div Y_2 = A$$
$$A \times Y_1 \div Z_2 = B$$
$$B \times Z_1 \div W_2 = X$$
$$\text{i.e. } W_1 \times \frac{Y_1}{Y_2} \times \frac{Z_1}{Z_2} \times \frac{1}{W_2} = X,$$
$$Y = \frac{Y_2}{Y_1},$$
$$Z = \frac{Z_2}{Z_1}$$

In a preferred embodiment, the absolute value of $W_1$ minus $W_2$ is smaller than or equal to 2, i.e. $|W_1-W_2|<2$. Thus the upper active gear 24 is almost the same with the lower active gear 34 in teeth number. Thus, those gears are capable of connecting to the portable device having the base and the cover with the same thicknesses. For example, when the included angle $D_1$ between the upper rotating bracket 22 and the connecting bracket 10 is 130 degrees, the included angle $D_1$ between the lower rotating bracket 32 and the connecting bracket 10 is 50 degrees, i.e. $D_1 \div D_2 = 130 \div 50 = 2.6 = R$. To make the velocity ratio X approximate to or equal to the included angle ratio R, the number of teeth may be as the following:

$W_1=17, Y_1=15, Y_2=9, Z_1=14, Z_2=9, W_2=17.$ i.e. $17 \times \dfrac{15}{9} \times \dfrac{14}{9} \times \dfrac{1}{17} = 2.5926 = X$ Therefore, the velocity ratio X approximates to the included angle ratio R. Thus, by the transmission gear assembly 40 adjusting the velocity ratio of the upper and lower active gears 24, 34 to approximate the ratio of the included angles, the dual-axis hinge as described forms a plane without a drop while opening. Usually, |R−X|<1, |R−X|<0.5, or |R−X|<0.05 may result in the upper and lower rotating brackets 22, 32 forming a plane without a drop while opening.

Figure 5:
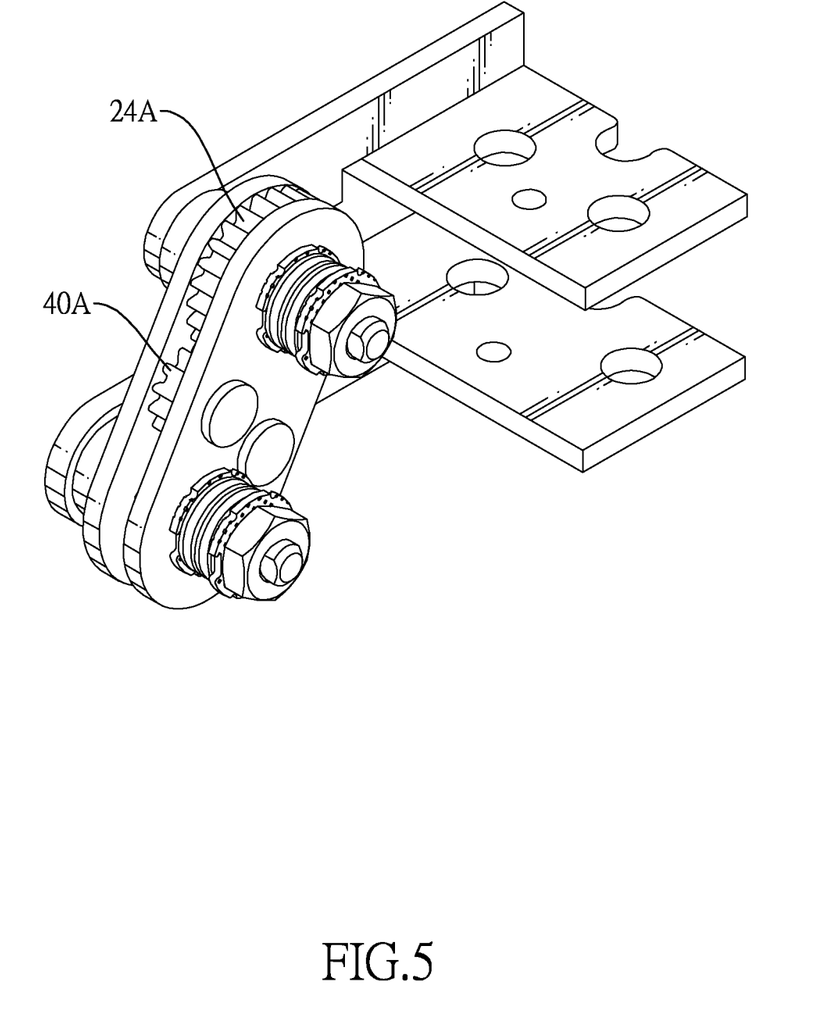
FIG. 5 is a perspective view of a second embodiment of a dual-axis hinge in accordance with the present invention.
Figure 6:
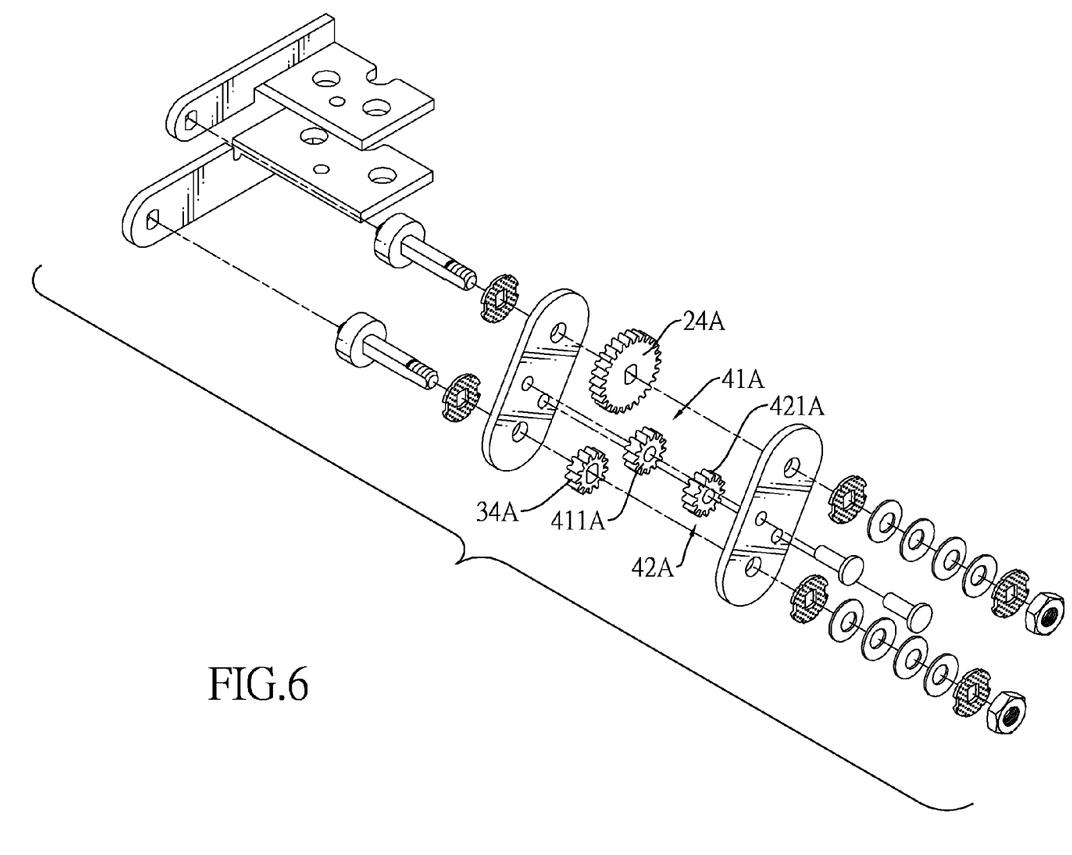
FIG. 6 is an exploded perspective view of the dual-axis hinge in FIG. 5.

However, if $Y_1$ plus $Y_2$ leaves a value approximating $Z_1$ plus $Z_2$, the small gear 412 of the upper inactive gear unit 41 may engage the large gear 421 of the lower inactive gear unit 42 because the sizes of the gears are not precisely manufactured. Then, the gears of the transmission gear assembly 40 cannot rotate. Therefore, in another preferred embodiment, $Y_1$ plus $Y_2$ leaves a value away from $Z_1$ plus $Z_2$. For example, the number of teeth may be as the following:

$W_1=18, Y_1=18, Y_2=10, Z_1=14, Z_2=11, W_2=16.$ i.e. $W_1 \times \dfrac{Y_1}{Y_2} \times \dfrac{Z_1}{Z_2} \times \dfrac{1}{W_2} = X$ $18 \times \dfrac{18}{10} \times \dfrac{14}{11} \times \dfrac{1}{16} = 2.57727 = X$ With reference to FIGS. 5 and 6, in another preferred embodiment, the upper inactive gear unit 41A comprises an upper inactive gear 411A, and the lower inactive gear unit 42A comprises a lower inactive gear 421A. The upper inactive gear 411A engages the upper active gear 24A. The lower inactive gear 421A engages the lower active gear 34A and the upper inactive gear 411A.

Figure 7:
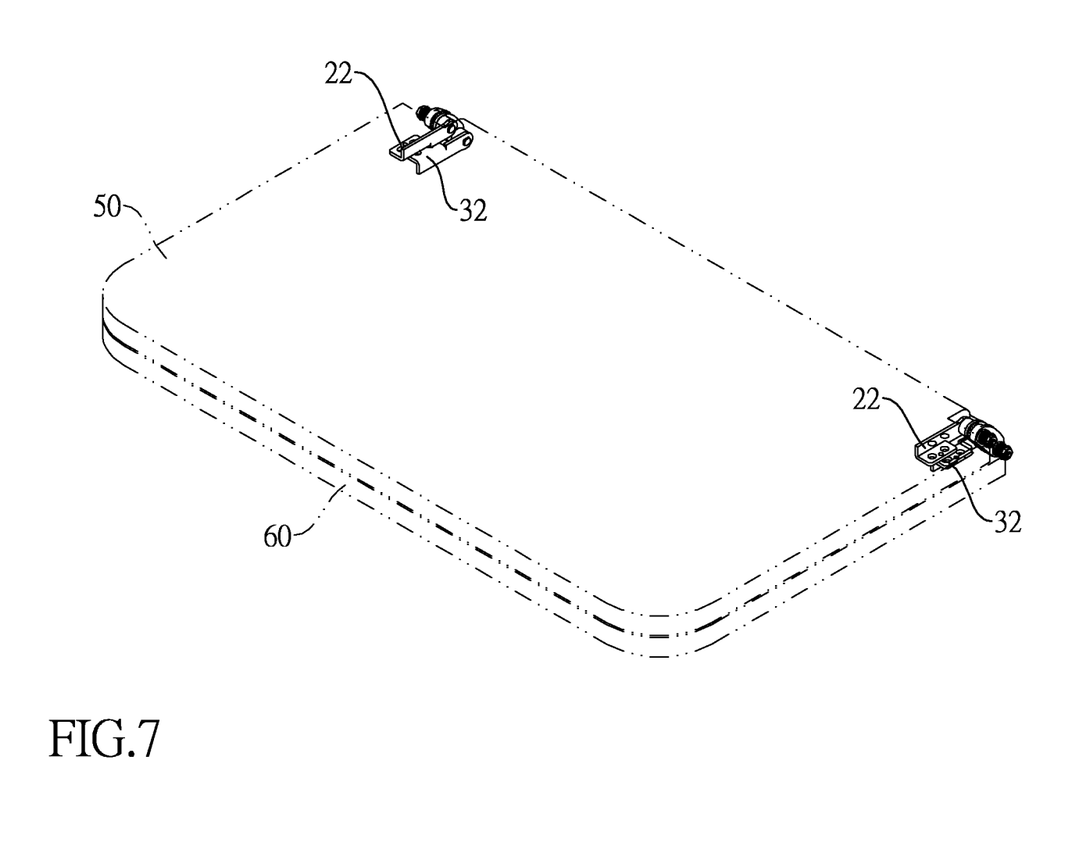
FIG. 7 is an operational perspective view of a portable device in accordance with the present invention, shown closed.

The number of teeth of the upper active gear 24A is $W_1$ and the number of teeth of the lower active gear 34A is $W_2$. The number of teeth of the upper inactive gear 411A is Y, and the number of teeth of the lower inactive gear 421A is Z. To make the velocity ratio X approximate to or equal to the included angle ratio R, the relationship of the aforementioned values satisfies the following formula:

$W_1 \div Y = A$ $A \div Z = B$ $B \div W_2 = X$ i.e. $W_1 \times \dfrac{1}{Y} \times \dfrac{1}{Z} \times \dfrac{1}{W_2} = X$ With reference to FIG. 7, a portable device in accordance with the present invention comprises two dual-axis hinges as described, a cover 50 and a base 60. The dual-axis hinges are mounted respectively on two sides between the cover 50 and the base 60. The upper rotating brackets 22 are attached securely to the cover 50. The lower rotating brackets 32 are attached securely to the base 60.

With reference to FIGS. 4 and 7, the cover 50 is relatively closed to the base 60. The included angle between the upper rotating bracket 22 and the connecting bracket 10 is $D_1$, and the included angle between the lower rotating bracket 32 and the connecting bracket 10 is $D_2$.

Figure 8:
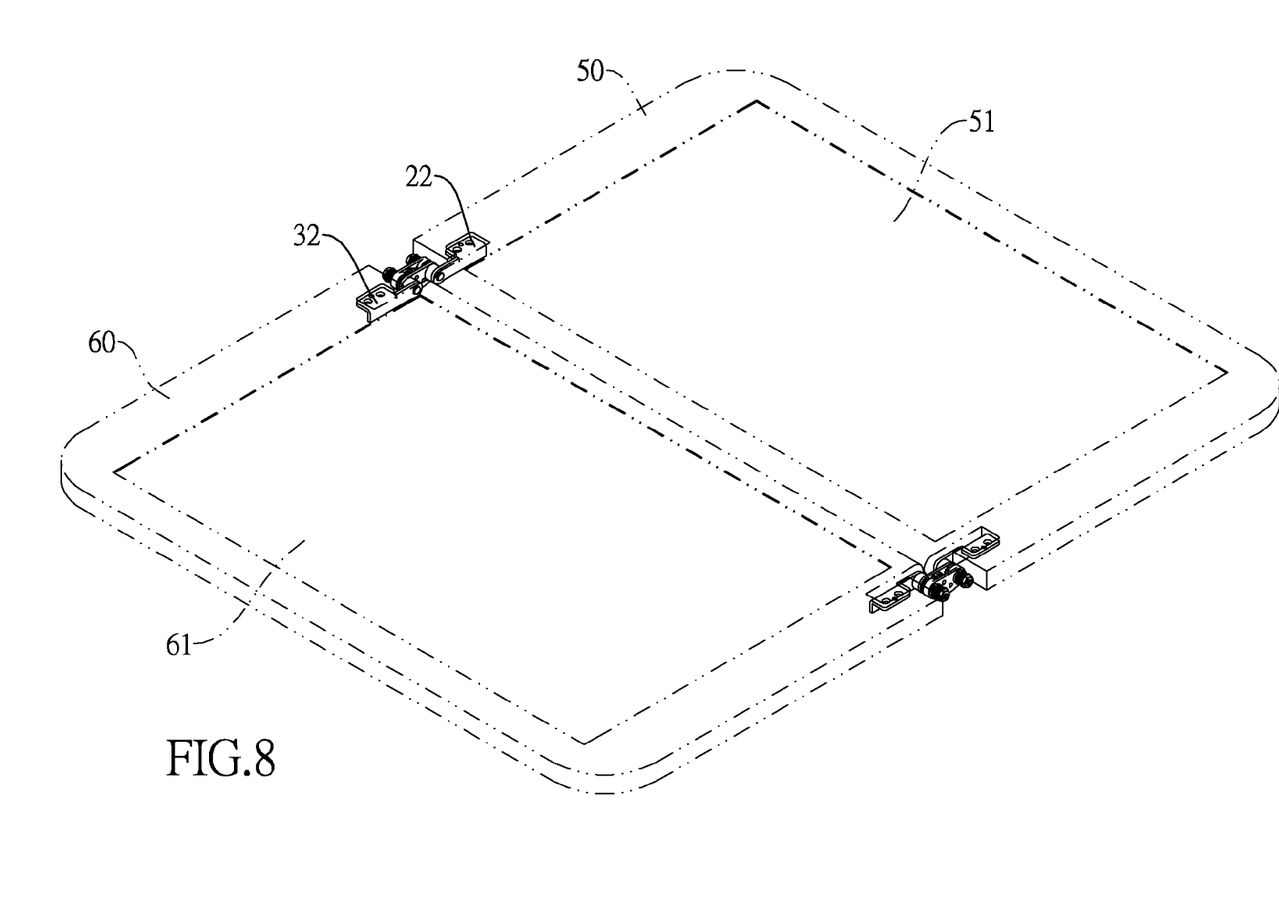
FIG. 8 is an operational perspective view of the portable device in FIG. 7, shown opened.
Figure 9:
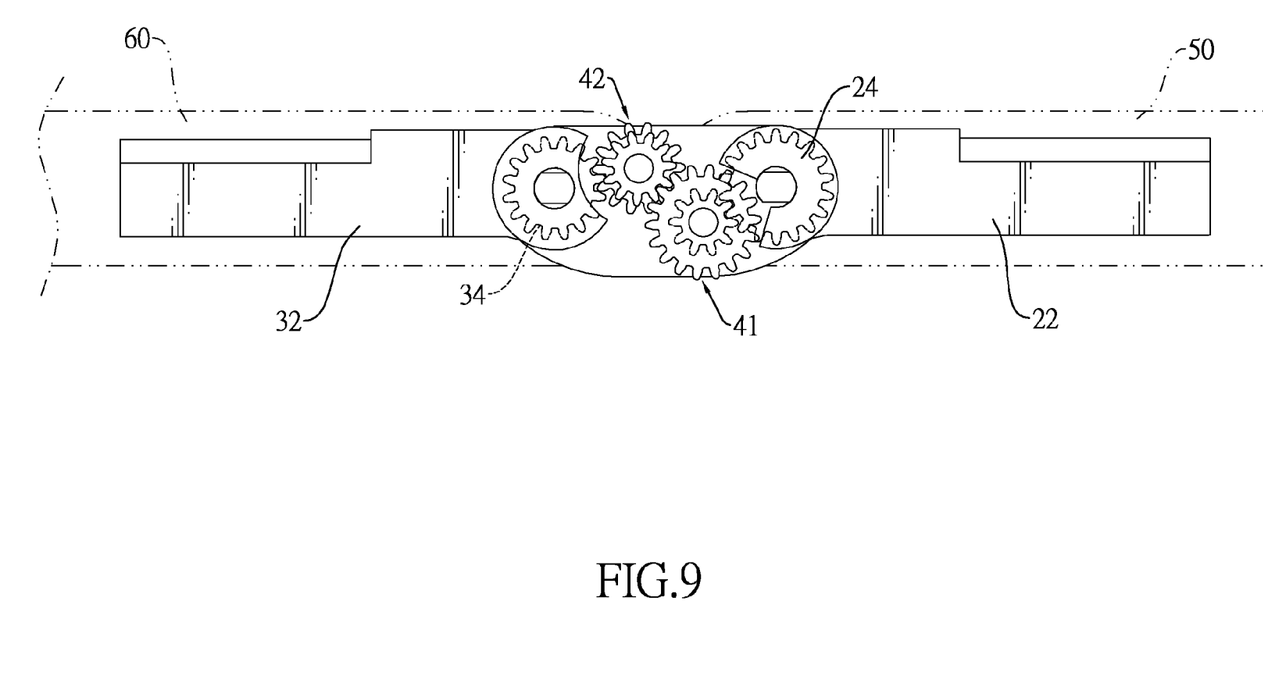
FIG. 9 is an enlarged operational perspective view of the portable device in FIG. 7, shown opened.

With reference to FIGS. 8 and 9, when the cover 50 is opened relative to the base 60, the upper rotating brackets 22 are rotated simultaneously with the cover 50. Then the upper active gears 24, the upper inactive gear units 41, the lower inactive gear units 42 and the lower active gears 34 are rotated in sequence. Because the upper and lower inactive gear units 41, 42 adjust the velocity ratio of the upper and lower active gears 24, 34, when the cover 50 is opened relative to the base 60 at 180 degrees, the cover 50 aligns with the base 60 without a drop so that the screen 51 on the cover 50 links with the screen 61 on the base 60 to form a whole screen.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A dual-axis hinge comprising:
    a connecting bracket having a gear room formed therein;
    an upper pintle assembly connected to the connecting bracket and comprising
        an upper pintle mounted rotatably through the gear room of the connecting bracket;
        an upper rotating bracket mounted securely around one end of the upper pintle; and
        an upper active gear mounted securely around the upper pintle and mounted in the gear room of the connecting bracket;
    a lower pintle assembly connected to the connecting bracket and comprising
        a lower pintle mounted rotatably through the gear room of the connecting bracket;
        a lower rotating bracket mounted securely around one end of the lower pintle; and
        a lower active gear mounted securely around the lower pintle and mounted in the gear room of the connecting bracket; and
    a transmission gear assembly mounted in the gear room of the connecting bracket and connected between the upper and lower active gears to adjust a velocity ratio of the upper and lower active gears,
    wherein an included angle between the upper rotating bracket and the connecting bracket is $D_1$, an included angle between the lower rotating bracket and the connecting bracket is $D_2$, $D_1$ is not equal to $D_2$, the velocity ratio of the upper and lower active gears is X, the ratio of the included angles is R, i.e. $D_2 \div D_1 = R$, and X approximates to or is equal to R.

2. The dual-axis hinge as claimed in claim 1, wherein the absolute value of R minus X is smaller than or equal to 1.

3. The dual-axis hinge as claimed in claim 2, wherein the velocity ratio X satisfies the following formula:

$$W_1 \times \dfrac{1}{Y} \times \dfrac{1}{Z} \times \dfrac{1}{W_2} = X,$$

wherein:
$W_1$ is a number of teeth of the upper active gear;
$W_2$ is a number of teeth of the lower active gear;

Y is a first velocity variance that the upper inactive gear unit provides; and

Z is a second velocity variance that the lower inactive gear unit provides.

4. The dual-axis hinge as claimed in claim 3, wherein:
the upper inactive gear unit comprises:
a large gear; and
a small gear coaxial with the large gear of the upper inactive gear unit and engaging the upper active gear;
the lower inactive gear unit comprises:
a large gear engaging the lower active gear; and
a small gear coaxial with the large gear of the lower active gear unit and engaging the large gear of the upper inactive gear unit;
the first velocity variance that the upper inactive gear unit provides satisfies the following formula:

$$Y = \frac{Y_2}{Y_1},$$

wherein:
$Y_1$ is a number of teeth of the large gear of the upper inactive gear unit; and
$Y_2$ is a number of teeth of the small gear of the upper inactive gear unit; and
the second velocity variance that the lower inactive gear unit provides satisfies the following formula:

$$Z = \frac{Z_2}{Z_1},$$

wherein:
$Z_1$ is a number of teeth of the large gear of the lower inactive gear unit; and
$Z_2$ is a number of teeth of the small gear of the lower inactive gear unit.

5. The dual-axis hinge as claimed in claim 3, wherein:
the upper inactive gear unit comprises an upper inactive gear engaging the upper active gear;
the lower inactive gear unit comprises a lower inactive gear engaging the upper inactive gear and the lower active gear;
the first velocity variance that the upper inactive gear unit provides is equal to a number of teeth of the upper inactive gear; and
the second velocity variance that the lower inactive gear unit provides is equal to a number of teeth of the lower inactive gear.

6. The dual-axis hinge as claimed in claim 3, wherein an absolute value of the number of teeth of the upper active gear minus the number of teeth of the lower active gear is smaller than or equal to 2.

7. The dual-axis hinge as claimed in claim 3, wherein the number of teeth of the upper active gear is the same with the number of teeth of the lower active gear.

8. The dual-axis hinge as claimed in claim 1, wherein the absolute value of R minus X is smaller than or equal to 0.5.

9. The dual-axis hinge as claimed in claim 8, wherein the velocity ratio X satisfies the following formula:

$$W_1 \times \frac{1}{Y} \times \frac{1}{Z} \times \frac{1}{W_2} = X,$$

wherein:
$W_1$ is a number of teeth of the upper active gear;
$W_2$ is a number of teeth of the lower active gear;
Y is a first velocity variance that the upper inactive gear unit provides; and
Z is a second velocity variance that the lower inactive gear unit provides.

10. The dual-axis hinge as claimed in claim 9, wherein:
the upper inactive gear unit comprises:
a large gear; and
a small gear coaxial with the large gear of the upper inactive gear unit and engaging the upper active gear;
the lower inactive gear unit comprises:
a large gear engaging the lower active gear; and
a small gear coaxial with the large gear of the lower active gear unit and engaging the large gear of the upper inactive gear unit;
the first velocity variance that the upper inactive gear unit provides satisfies the following formula:

$$Y = \frac{Y_2}{Y_1},$$

wherein:
$Y_1$ is a number of teeth of the large gear of the upper inactive gear unit; and
$Y_2$ is a number of teeth of the small gear of the upper inactive gear unit; and
the second velocity variance that the lower inactive gear unit provides satisfies the following formula:

$$Z = \frac{Z_2}{Z_1},$$

wherein:
$Z_1$ is a number of teeth of the large gear of the lower inactive gear unit; and
$Z_2$ is a number of teeth of the small gear of the lower inactive gear unit.

11. The dual-axis hinge as claimed in claim 9, wherein:
the upper inactive gear unit comprises an upper inactive gear engaging the upper active gear;
the lower inactive gear unit comprises a lower inactive gear engaging the upper inactive gear and the lower active gear;
the first velocity variance that the upper inactive gear unit provides is equal to a number of teeth of the upper inactive gear; and
the second velocity variance that the lower inactive gear unit provides is equal to a number of teeth of the lower inactive gear.

12. The dual-axis hinge as claimed in claim 9, wherein an absolute value of the number of teeth of the upper active gear minus the number of teeth of the lower active gear is smaller than or equal to 2.

13. The dual-axis hinge as claimed in claim 9, wherein the number of teeth of the upper active gear is the same with the number of teeth of the lower active gear.

14. The dual-axis hinge as claimed in claim 1, wherein the absolute value of R minus X is smaller than or equal to 0.05.

15. The dual-axis hinge as claimed in claim 14, wherein the velocity ratio X satisfies the following formula:

$$W_1 \times \frac{1}{Y} \times \frac{1}{Z} \times \frac{1}{W_2} = X,$$

wherein:
- $W_1$ a number of teeth of the upper active gear;
- $W_2$ a number of teeth of the lower active gear;
- Y is a first velocity variance that the upper inactive gear unit provides; and
- Z is a second velocity variance that the lower inactive gear unit provides.

16. The dual-axis hinge as claimed in claim 15, wherein:
the upper inactive gear unit comprises:
- a large gear; and
- a small gear coaxial with the large gear of the upper inactive gear unit and engaging the upper active gear;

the lower inactive gear unit comprises:
- a large gear engaging the lower active gear; and
- a small gear coaxial with the large gear of the lower active gear unit and engaging the large gear of the upper inactive gear unit;

the first velocity variance that the upper inactive gear unit provides satisfies the following formula:

$$Y = \frac{Y_2}{Y_1},$$

wherein:
- Y1 is a number of teeth of the large gear of the upper inactive gear unit; and
- Y2 is a number of teeth of the small gear of the upper inactive gear unit; and the second velocity variance that the lower inactive gear unit provides satisfies the following formula:

$$Z = \frac{Z_2}{Z_1},$$

wherein:
- $Z_1$ is a number of teeth of the large gear of the lower inactive gear unit; and
- $Z_2$ is a number of teeth of the small gear of the lower inactive gear unit.

17. The dual-axis hinge as claimed in claim 15, wherein:
the upper inactive gear unit comprises an upper inactive gear engaging the upper active gear;
the lower inactive gear unit comprises a lower inactive gear engaging the upper inactive gear and the lower active gear;
the first velocity variance that the upper inactive gear unit provides is equal to a number of teeth of the upper inactive gear; and
the second velocity variance that the lower inactive gear unit provides is equal to a number of teeth of the lower inactive gear.

18. The dual-axis hinge as claimed in claim 15, wherein an absolute value of the number of teeth of the upper active gear minus the number of teeth of the lower active gear is smaller than or equal to 2.

19. The dual-axis hinge as claimed in claim 15, wherein the number of teeth of the upper active gear is the same with the number of teeth of the lower active gear.

20. The dual-axis hinge as claimed in claim 1, wherein the velocity ratio X satisfies the following formula:

$$W_1 \times \frac{1}{Y} \times \frac{1}{Z} \times \frac{1}{W_2} = X,$$

wherein:
- $W_1$ is a number of teeth of the upper active gear;
- $W_2$ is a number of teeth of the lower active gear;
- Y is a first velocity variance that the upper inactive gear unit provides; and
- Z is a second velocity variance that the lower inactive gear unit provides.

21. The dual-axis hinge as claimed in claim 20, wherein:
the upper inactive gear unit comprises:
- a large gear; and
- a small gear coaxial with the large gear of the upper inactive gear unit and engaging the upper active gear;

the lower inactive gear unit comprises:
- a large gear engaging the lower active gear; and
- a small gear coaxial with the large gear of the lower active gear unit and engaging the large gear of the upper inactive gear unit;

the first velocity variance that the upper inactive gear unit provides satisfies the following formula:

$$Y = \frac{Y_2}{Y_1},$$

wherein:
- $Y_1$ is a number of teeth of the large gear of the upper inactive gear unit; and
- $Y_2$ is a number of teeth of the small gear of the upper inactive gear unit; and the second velocity variance that the lower inactive gear unit provides satisfies the following formula:

$$Z = \frac{Z_2}{Z_1},$$

wherein:
- $Z_1$ is a number of teeth of the large gear of the lower inactive gear unit; and
- $Z_2$ is a number of teeth of the small gear of the lower inactive gear unit.

22. The dual-axis hinge as claimed in claim 20, wherein:
the upper inactive gear unit comprises an upper inactive gear engaging the upper active gear;
the lower inactive gear unit comprises a lower inactive gear engaging the upper inactive gear and the lower active gear;
the first velocity variance that the upper inactive gear unit provides is equal to a number of teeth of the upper inactive gear; and
the second velocity variance that the lower inactive gear unit provides is equal to a number of teeth of the lower inactive gear.

23. The dual-axis hinge as claimed in claim 20, wherein an absolute value of the number of teeth of the upper active gear minus the number of teeth of the lower active gear is smaller than or equal to 2.

24. The dual-axis hinge as claimed in claim 20, wherein the number of teeth of the upper active gear is the same with the number of teeth of the lower active gear.

25. The dual-axis hinge as claimed in claim 1, wherein:
- the upper pintle assembly comprises an upper torsion generating assembly mounted around the upper pintle and located at an opposite end to the upper rotating bracket; and
- the lower pintle assembly comprises a lower torsion generating assembly mounted around the lower pintle and located at an opposite end to the lower rotating bracket.

26. The dual-axis hinge as claimed in claim 1, wherein:
- the connecting bracket comprises a front panel and a rear panel; and
- the gear room of the connecting bracket is formed between the front and rear panels.

27. A portable device with two dual-axis hinges as claimed in claim 1 comprising:
- a cover;
- a base mounted pivotally to the cover;
- the two dual-axis hinges mounted respectively on two sides between the cover and the base;
- the upper rotating brackets of the two dual-axis hinges attached securely to the cover; and
- the lower rotating brackets of the two dual-axis hinges attached securely to the base.

* * * * *